US012755090B2

(12) United States Patent
Melton et al.

(10) Patent No.: US 12,755,090 B2
(45) Date of Patent: Oct. 6, 2026

(54) SYSTEMS AND METHODS FOR EXTRACTING DATA USING FLOW GRAPHS

(71) Applicant: Disolve Inc., La Mesa, CA (US)

(72) Inventors: Alexander Melton, La Mesa, CA (US); Amanda Esposito, La Mesa, CA (US)

(73) Assignee: Disolve Inc., La Mesa, CA (US)

( * ) Notice: Subject to any disclaimer, the term of this patent is extended or adjusted under 35 U.S.C. 154(b) by 226 days.

(21) Appl. No.: 18/835,255

(22) PCT Filed: Feb. 3, 2023

(86) PCT No.: PCT/US2023/012288

§ 371 (c)(1),
(2) Date: Aug. 1, 2024

(87) PCT Pub. No.: WO2023/150275

PCT Pub. Date: Aug. 10, 2023

(65) Prior Publication Data

US 2025/0139355 A1 May 1, 2025

Related U.S. Application Data

(60) Provisional application No. 63/306,442, filed on Feb. 3, 2022.

(51) Int. Cl.
*G06F 40/174* (2020.01)
*G06F 16/901* (2019.01)

(52) U.S. Cl.
CPC ........ *G06F 40/174* (2020.01); *G06F 16/9024* (2019.01)

(58) Field of Classification Search
CPC .... G06F 40/174; G06F 16/9024; G06Q 10/10
See application file for complete search history.

(56) References Cited

U.S. PATENT DOCUMENTS 8,234,561 B1 7/2012 Bourdev
2005/0257134 A1 11/2005 Goodman et al.
(Continued)

OTHER PUBLICATIONS

Wang et al., "Automatic Filling Forms of Deep Web Entries Based on Ontology," in 2009 International Conference on Web Information Systems and Mining. Date of Conference: Nov. 7-8, 2009, retrieved on Mar. 24, 2023, retrieved from the Internet <URL: https://ieeexplore.ieee.org/stamp/stamp.jsp?tp=&arnumber=5368235>.

*Primary Examiner* — Asher D Kells
(74) *Attorney, Agent, or Firm* — DLA Piper LLP (US)

(57) ABSTRACT

A form completion system provides a form completion engine that increases the efficiency and speed of the form filling process required to apply for services and complete events. The form completion engine may generate a flow graph that identifies a complete list of all forms required to apply for a particular service to eliminate time wasted in preparing partial applications. The flow graph may include links between different forms and each field required to be filled out by a particular entity. The flow graphs may be traversed in order to generate questions that elicit user responses including information required by the forms. The form completion engine may automatically fill in each field of the required forms using user responses to the questions and entity data stored by the form completion system.

20 Claims, 7 Drawing Sheets

(56) References Cited

U.S. PATENT DOCUMENTS

| | | | |
|---|---|---|---|
| 2007/0089049 | A1 | 4/2007 | Gormish et al. |
| 2008/0235567 | A1 | 9/2008 | Raj et al. |
| 2014/0032480 | A1* | 1/2014 | Lesage .................... G06F 40/14 707/E17.039 |
| 2014/0122989 | A1 | 5/2014 | Eigner et al. |
| 2014/0298199 | A1* | 10/2014 | Johnson, Jr. ......... G06Q 10/101 715/753 |
| 2015/0205777 | A1 | 7/2015 | Campanelli |
| 2017/0249592 | A1 | 8/2017 | Rossi et al. |

* cited by examiner

SYSTEMS AND METHODS FOR EXTRACTING DATA USING FLOW GRAPHS

CROSS-REFERENCE TO RELATED APPLICATIONS

This application is a 35 USC § 371 National Stage application of International Application No. PCT/US2023/012288 filed Feb. 23, 2023, which claims the benefit under 35 USC § 119 (e) to U.S. Application Ser. No. 63/306,442 filed Feb. 3, 2022. The disclosure of each of the prior applications is considered part of and is incorporated by reference in the disclosure of this application.

FIELD OF THE INVENTION

The present disclosure generally provides a computer implemented method and more specifically, a form completion system that increases the efficiency and speed of the form filling process to apply for services and complete events.

BACKGROUND

Forms, surveys, and other tools for exacting information are gateways to many important events and services. For example, a myriad of forms are required to obtain healthcare services, pay taxes, enroll in school, purchase property, quality for government services, start a new job, and perform may other important functions. Many of these events require completing multiple forms and different forms required for the same event may be stored in disparate locations. Accordingly, identifying and locating all of the necessary forms may be as complex and time consuming as actually completing the set of required forms. Each form may have a different format and request different information. Many forms, however, require similar information, therefore, filling out multiple forms may be time consuming and inefficient because of the amount of duplicate work required.

Current technology for locating and completing forms focuses on improving the experience of form filling. For example, a slick user interface used to obtain user responses for each field required by a form eliminates the need to view and navigate the full form. Some of the user interfaces also have an autocomplete function which can automatically fill some fields based on previously recorded information. However, current technology is based on rigid, rules-based logic that cannot be adapted to changes in user data, data formats, or form content. Additionally, current technology does not improve the speed or efficiency of the form filling process or ensure all required forms are completed. Accordingly, there is a need to develop a solution that identifies all the necessary forms to complete for a particular event or service using a flexible data structure that can be easily updated. There is also a need to develop a solution that discovers relationships between forms and uses the known relationships to accelerate the form completion process.

DETAILED DESCRIPTION OF SEVERAL EMBODIMENTS

Figure 1:
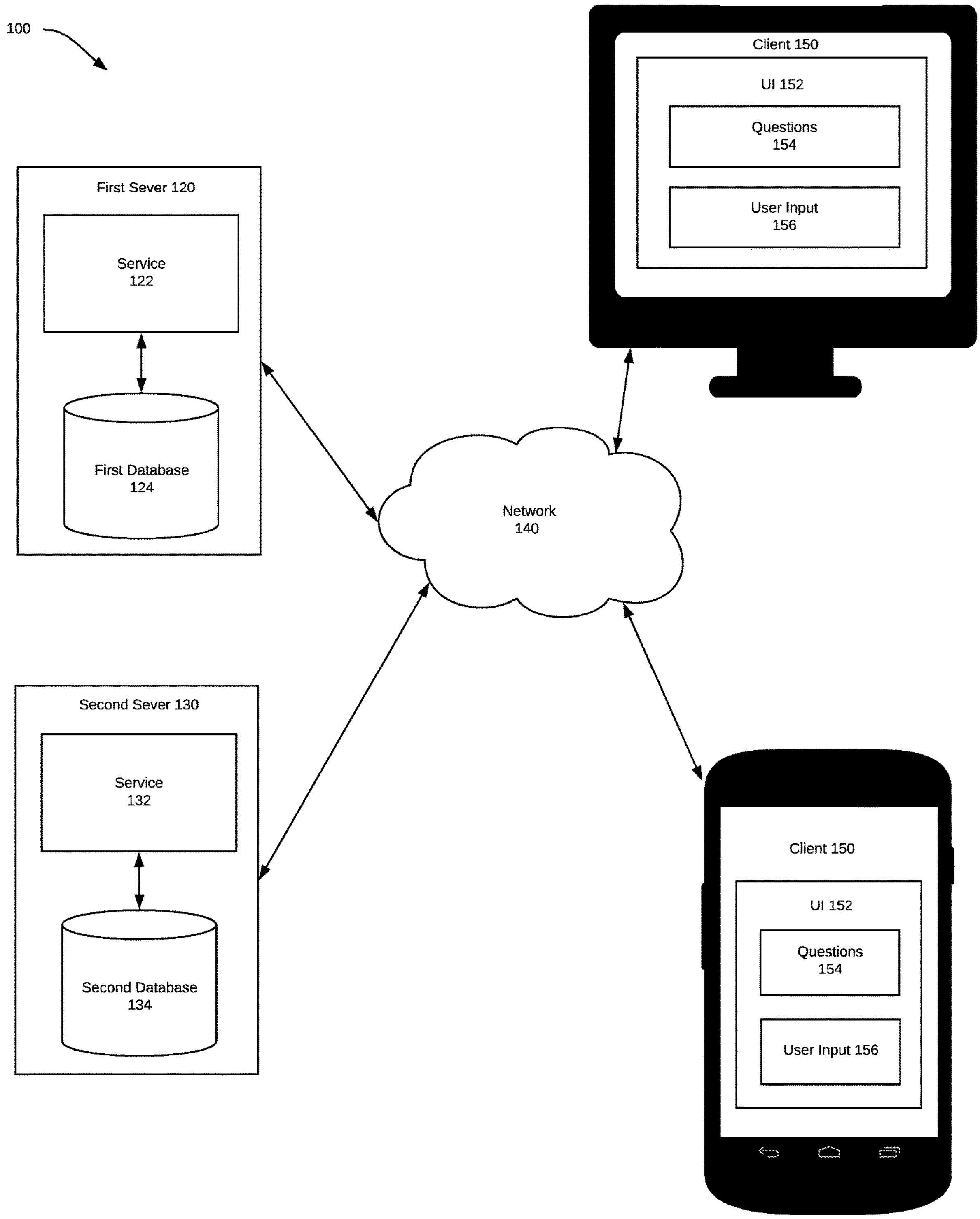
FIG. 1 illustrates an example system for data extraction according to various embodiments of the present disclosure.

The disclosed technology provides a new form completion system that facilitates the discovery and completion of forms required for one or more services. The form completion system generates a flow graph that maps the dependencies between multiple forms included in a form library. The form completion system may also map the order which the forms ought to be filled out based on the placement of the nodes within the flow graph. In various embodiments, the flow graph may be an acyclic graph where the shortest path to a terminating node is the most efficient order for filling out forms. The nodes may be placed within the flow graph to maximize data re-usability across all qualified forms for the user. For example, the first form presented according to the flow graph will always be the form that narrows down the most paths based on the responses to the questions on that form.

The flow graph may include one or more clusters of forms with each cluster corresponding to the set of forms required to qualify for a particular outcome or service. Each form included in the cluster may include any collection of questions. Forms included in the clusters are often tied to an actually physical form related to an outcome or service but some forms may be a collection of questions that aren't a part of an actual form but include, for example, more high level qualifying questions or simplified versions of forms that don't match the real form 1:1 but extract the same information. The flow graph may also include links between individual forms in a cluster and/or links between clusters. The links provide the most efficient path towards a benefit and all non-terminating paths from the starting node are benefits the user qualifies for. Each link may have a rule associated with it which determines if that link is traversable for a particular user. If the user does not meet the requirements for the destination node at the end of the path, the link is considered invalid. Any forms orphaned due to a link break are not applicable to the user. Accordingly, the links included in the flow graph may be used to discover new services and/or forms that may be useful to a particular user. For example, links between clusters may identify new services that a user may qualify for and links between forms may be used to identify forms that a user is either required to fill out or may exclude from the application process for a particular service. Accordingly, the form completion system expedites the form filing process by eliminating the need to manually aggregate forms from desperate locations.

The form completion system also delivers complete sets of forms required to qualify for a particular outcome or service to users to eliminate time wasted by submitting partial applications. To generate completed forms users are provided an aggregate list of questions which illicit data required to fill out the forms the users qualify for. A user is first asked a set of questions that determine the entry node. Once the entry node is qualified, users are presented with a consolidated list of questions that illicit any information not already known by the system. For example, if a user is on Form 2 and Form 2 requires the user's name but the user's name was already received in the user's response to the Form 1 questions, the system does not ask for the same information again. The system continues to deliver questions as the user traverses the flow graph and then backfills the data provided in the user responses into the forms the user qualifies for. Once the user has successfully traversed the flow graph, the system provides all of the forms that are filled out to completion to the user.

To facilitate form completion, the flow graphs are traversed to generate questions that extract the information required to complete the forms. Using the dependency relationships between the fields included in each form, forms requiring the same data fields can be identified allowing the same user response to be re-used automatically in each form including the same field. Conversion tools may also convert data included in a user response to other formats so that multiple fields may be derived from the same user response. For example, the conversion tool may convert a birthdate into age, birth year, birth month, legal status (e.g., minor or adult), and the like. The data conversions generated by the system and the identified relationships between multiple forms dramatically reduce the number of questions presented to users during the form completion process and improve the accuracy of completed forms by minimizing human error.

The flow graphs generated by the form completion system may be automatically updated as new forms are mapped and added to the form library. The flow graphs may also be re-generated for particular users each time the user's entity data changes. Accordingly, the system may use the flow graphs to continuously discover new services for users over time. For example, as more forms are added to the form library additional services and their corresponding form clusters may be included in a particular user's flow graph. Similarly, changes in the user's age, health, income, and other data may alter the services the user qualifies for. The flow graph generated for the user will adapt to the changes in the user's data by including clusters that correspond to the updated list of services. Accordingly, the form completion system may be used to identify additional services for users to apply for and determine which services each user qualifies for based on the user's specific data.

Thus, the disclosed technology provides a form completion system that generates a flow graph that maps the dependencies between form clusters and individual forms. The flow graphs may be used to identify services users qualify for and the forms required to apply for each service. The dependency relationships between the forms and the field mappings for each mapped form included in the form library may be used to expedite the form filing process and improve that accuracy of completed forms by reducing the prompted responses users must submit to fill out a complete set of qualifying forms.

To reduce flow graph computation time, minimize server bandwidth, and otherwise improve performance of the form completion system, the flow graph itself along with the paths, rules, and nodes may be generated anytime there is an update to the form library, question bank, conversion tool, rules tool, entity tool, or any other internal tool. When the user provides data, the paths are either traversable or not traversable based on their responses. The graph itself isn't regenerated on user data, it just changes the valid pathing on the existing graph. Accordingly, the flow graph may be effectively read only from the user's perspective. The flow graph may include boolean logic that adjusts which paths are traversable based on the user data but the graph itself only updates when an internal tool updates the dependencies.

The flow graphs may be stored as static objects that may traversed to complete forms and/or determine the relationships between particular forms and/or form clusters. Storing form clusters as static objects improves the performance of the form completion system and reduces operating costs relative to architectures that construct a new flow graph each time a user wants to user the form completion system to fill out a collection of forms. Periodically updating the flow graphs according to a pre-defined schedule (e.g., every day, every month, and/or after entity data is updated or some other event occurs) ensures the flow graphs are accurate and up to date while also maximizing the amount of form fields which can be completed using previously collected entity data.

FIG. 1 illustrates an example form completion system 100 configured to identify and complete forms in accordance with the disclosed principles. System 100 includes a first server 120, second server 130, and/or one or more client devices 150. First server 120, second server 130, and/or client device(s) 150 are configured to communicate with one another through network 140. For example, communication between the elements is facilitated by one or more application programming interfaces (APIs). APIs of system 100 can be proprietary and/or can be examples available to those of ordinary skill in the art such as Amazon® Web Services (AWS) APIs or the like. Network 140 can be the Internet and/or other public or private networks or combinations thereof.

The first server 120 is configured to implement a form completion engine that is used to generate multiple flow graphs based on entity data and a form library that includes multiple mapped forms. In general, all of the forms required for a particular outcome or service may be included in the same flow graph, however multiple flow graphs for the same universe of forms may be needed when the graph generates an orphaned cluster inaccessible by another entry point. Orphaned form clusters may require the system to generate two graphs when there are absolutely no dependencies between to form sets and none of the questions asked in either of the sets could possibly create a link to the other. This could happen between, for example, a tax form and a medical form where there is not a single shared data point between the two The flow graphs for each of the orphaned form clusters may have their own entry points and initial qualifying questions.

The form completion engine may serve questions generated by a question tool. For example, the question tool may generate and manage a question bank that includes manually and/or machine generated questions that extract the entity data required to complete forms from multiple users. The question tool may format the questions in the question bank to have a machine readable data type that is compatible with the flow graph. For example, if the flowgraph needs the NUMBER:AGE:APPLICANT value to progress the flowgraph will ask the form completion engine to serve the question associated with that entity datatype. The form completion engine will then fetch the question from the question bank by providing two entities, the data type, and the format (e.g., [Data Type]:[Field Name]:[Entity In Question]:[User Entity]).

The format of the question may be changed based on the user's relationship to the applicant listed on the form. For example, if the applicant is filling out the form the data type would be NUMBER:AGE:APPLICANT:APPLICANT and the return value might be something like "What is your age?" and the user interface would provide a field that only accepts numbers. But if the data type was NUMBER:AGE:PATERNAL:APPLICANT the question would be "How old is your father?". To manage different types of users and ensure the questions provided by the form completion engine match the user type, the question bank may have the questions destructured like this:

(this is stored in the user's profile as an entity profile):
PATERNAL—"father"
RELATION—"son"
MATERNAL—"mother"
RELATION—"son"
DOCTOR—"primary care physician"
RELATION—"patient" APPLICANT-"Alex"
GENDER—M
(this is stored in the question bank):
APPLICANT:APPLICANT—"How old are you?"
*: APPLICANT—"How old is your [$ENTITY]?"
APPLICANT:*—"How old is your [$RELATION?]"

All of these relationships may be stored in tree data structure stored in the question bank.

The mapping forms included in the form library, flow graphs, and/or entity data may be stored in one or more databases including a first database 124. The first service 122 may manage and/or provides access to the first database 124 and/or the form completion engine. For example, the first service 122 performs form completion engine management tasks including updating the form library with new mapped forms, modifying user data, syncing user data and/or mapped forms with data and/or forms included in other services, generating new flow graphs, encrypting or otherwise securing data received from other services and/or stored in one or more databases and the like. The flow graphs generated by the first service 122 may be used to identify services users qualify for and the forms required to apply for each service. The first service 122 may also generate questions that prompt users to provide certain data required by the forms. Additionally, the first service 122 may automatically input the data included in user responses to the questions into the identified forms in order to expedite the form completion process.

Alternate architectures for the form completion service may also be used. For example, the form completion service may include a segmented architecture including multiple tools. Each tool may be its own service the form completion engine is designed to be modular so new tools may be created as needed. The primary purpose of the tools is to segment the mapping of data into a single place. The question tool for example is only used to create well written plain language questions that represent each data point that is needed. The segmented architecture allows for a staff member or machine learning model that is an expert at plain language writing only worry about the question generation one piece of the system without getting bogged down in the technical details of the overall system (in the case of the human writer) or interoperability with other components of the system (in the case of the machine learning model). The segmented architecture allows subject matter experts (i.e., disability activists, medical professionals, legal experts, social workers, etc all work internally on making sure the flowgraph is constructed accurately for their field of expertise without requiring them to understand the other aspects of the system. The tools in the segmented architecture have a lot of interdependence on each other and are all needed to create the final system. The segmented architecture also supports more efficient expansion of the system to new subject matter domains and applications.

A second service 132 hosted on the second server 130 may communicate with the first service 122 to establish a server-to-server connection between the first server 120 and the second server 130. The second service 132 be a service operated by a government agency, private corporation, or other service provider. The second service 132 may host a repository of forms that must be completed to apply for a particular service and/or a set of rules or conditions that specify the type of data that must be entered into the forms and/or the forms that need to be completed for by particular users to apply for particular services. The second service 132 may provide the forms and/or rules or conditions to the form completion engine to facilitate form mapping and flow graph generation. The second service 132 may also be an electronic file service configured to receive digital copies of one or more forms. Completed forms generated by the first service 122 may be uploaded to the second service 132 to complete an application process for a particular service.

In various embodiments, the form completion engine may have a segmented architecture that includes multiple tools. In the segmented architecture, each tool may be its own microservice which is accessed by the gateway (e.g., a gateway API). The gateway may traverse the flow graph by comparing the user data to the flow graph through a flow walker. The flow walker may resolve each missing data point it encounters in the flow graph by requesting the data it needs to continue in response to the comparison by the gateway. The gateway may then respond with a question constructed from the missing data point that elicits the missing information requested by the flow graph from the user. The segmented architecture is described in more detail below.

Client device(s) 150 can be any device configured to connect to the first service 122 to establish a client-to-server connection between a client hosted by the client device(s) 150 and the first server 120. For example, the client device(s) 150 may include one or more smartphones, laptops, desktop computers, tablets, and the like. Users enter responses to questions by entering inputs into the UI( ) and the client device(s) transfer the responses received in the UI 152 to the form completion engine as entity data. The client hosted by the client device(s) 150 includes a user interface (UI) 152 that enables users to view questions 154 provided by the form completion engine. In various embodiments, the questions presented to the user in the UI 152 may be entity aware. For example, a doctor using the form completion engine might be asked questions relating to a patient which updates a related entity. In other examples, a social worker filling out the questions on behalf of the applicant may be asked questions about the applicant that are within the social worker's area of expertise. The UI 152 may also include a check box, free form text box, or other structure that receives input thereto to allow users to enter text and other user inputs 156 in response to one or more questions 154. The user inputs 156 may be received by the first service 122 and used to update entity data for the user during flow graph generation and/or complete forms identified based on the flow graphs. The UI 152 may also include a form viewing feature that displays in-progress and/or completed forms generated by the form completion engine. The UI 152 may also include a form editing feature that enables users to enter user inputs 156 that modify in-progress and/or completed forms.

First server 120, second server 130, first database 124, second database 134, and client device(s) 150 are each depicted as single devices for case of illustration, but those of ordinary skill in the art will appreciate first server 120, second server 130, first database 124, second database 134, and client device(s) 150 can be embodied in different forms for different implementations. For example, any or each of the first server 120 and second server 130 can include a plurality of servers or one or more of the databases 124, 134. Alternatively, the operations performed by any or each of first server 120 and second server 130 can be performed on fewer (e.g., one or two) servers. In another example, a plurality of client devices 150 communicate with first server 120 or second server 130. A single user can have multiple client device(s) 150, and/or there can be multiple users each having their own client device(s) 150.

Figure 2:
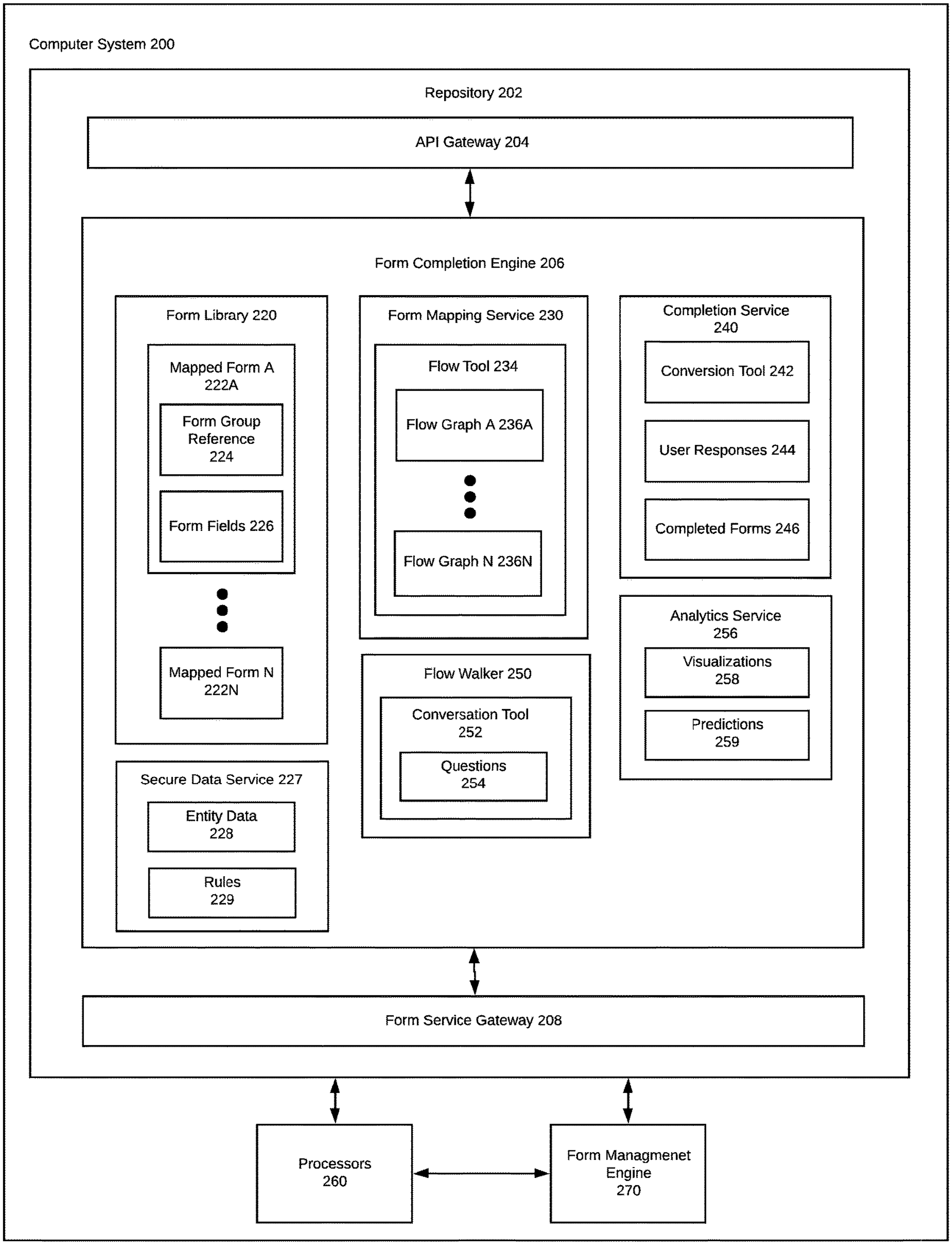
FIG. 2 shows more details of the example system shown in FIG. 1 according to various embodiments of the present disclosure.

FIG. 2 is a block diagram illustrating an example computer system 200 in accordance with one or more embodiments disclosed herein. The computer system 200 includes a repository 202, a form management engine 270, and one or more computer processors 260. In one or more embodiments, the computer system 200 can take the form of the computing device 700 described in FIG. 7 and the accompanying description below or the form of the client device 150 described with respect to FIG. 1. In one or more embodiments, each computer processor 260 takes the form of the computer processor 702 described with respect to FIG. 7.

In one or more embodiments, the repository 202 can be any type of storage unit and/or device (e.g., a file system, database, collection of tables, or any other storage mechanism) for storing data. Further, the repository 202 can include multiple different storage units and/or devices. In one or more embodiments, the repository 202 includes an API gateway 204, a form completion engine 206, and a form service interface 208. The API gateway 204 interfaces with a client (e.g., a mobile application executed on a smart phone or other client device) to send questions and other data generated by the form completion engine 206 to the client device and receive user responses and other data provided by users from the client device. The form completion engine 206 may interface with the form service gateway 208 to scrape form data (e.g., form rules) from a government agency or other service that provides and accepts forms.

Form rules may also be generated by a rules tool which maps form eligibility requirements to entity data types. The rules tool may be one or more segmented services with the form completion engine that creates a series of boolean expressions which are rendered as paths on the final flow graph. These rules may be created manually by professionals within the rules tool (as a subset of the entity tool). The rules tool may be a subset of the entity tool because the rules relating to specific form qualifications are dependent on the entity data itself. For example, AGE:APPLICANT would qualify several unrelated forms in of itself. Having many forms reliant on age data would make this a great candidate for an initial qualifying question since it's likely to have the most rules associated with it (and thus the most paths on the flow graph we can qualify). To maintain compliance with local regulations and ensure the rules are correct the form rules may be created manually by an expert with the entity rules tool front end. In the segmented architecture described above, the form completion engine would only expose the rules tool to a particular subject matter expert in order to simply the rules creation process for the expert.

The form completion engine 206 may also interact with an electronic file service or other platform that accepts forms via the form service gateway 208 to submit forms completed by the form completion engine to the government agency or other organization that provides the service associated with the forms. For example, the form service gateway 208 may include one or more APIs that send requests and/or upload forms and other data to a third party electronic file service. The form service gateway 208 may also generate one or more API calls that are formatted to interact with one or more third party APIs to request and download forms, form rules, axioms, and other data associated with forms and/or services provided by the one or more third parties. The form service gateway may also enable users to download the completed forms to submit them manually in the event automatic submission to an agency is not possible.

The form completion engine 206 may include a form library, a secure data service 227, a form mapping service 230, an entity service 240, a flow walker 250, an analytics service 256, and one or more other software components that perform a series of processes of the algorithms that generate mapped forms and provide the form completion process described below in FIG. 6. The form library 200 may include multiple mapped forms 222A, . . . , 222N that have been previously ingested and mapped by the form completion engine 206. Each of the mapped forms 222A, . . . , 222N may correspond to a form or other document stored in the form library 220 that has been defined as a set of fields and rules by the form mapping service 230. Each of the mapped forms 222A, . . . , 222N may be organized according to a hierarchy that includes form groups, forms, and fields. Form groups are collections of forms that are related. For example, forms that belong to a same government agency or other organization (e.g., the IRS, Department of Health and Human Services, a particular business, a particular university, and the like), are part of the same benefit program (e.g., social security, Medicare, a product rebate, scholarship, and the like), or have some other common relationship may be included in the same form group. Form groups may be objects that are defined using three data types including:

1) Form group identification;
2) Form group description; and
3) Form group rules The group identification may include, for example, a string of text, alpha numeric sequence, or other indenter (ID) for the group. The form group description may include a string of text, table, list, array or other data type that provides more information about the form group including, for example, the type of form group, titles of the forms in the group, the service/organization that corresponds to the form group, and the like. For example, "Medicare application forms" may be a form group description for a form group including the forms required to apply for Medicare benefits. The rules for the form group may include conditional expressions or other logic that can be used to decide when the group of forms needs to be submitted for a particular entity. For example, the form group rules may include one or more if, then statements or other conditional logic that may determine whether a particular user seeking to qualify for a service and/or complete an event is required to fill out the form group. Each mapped form 222A, . . . , 222N included in the form library 220 m22N. Fay be associated with a particular form group and form groups may include multiple mapped forms 222A, . . . , 2or example, a mapped form A 222A may have a form group reference 224 that includes the form group ID for the one or more form groups that include the particular mapped form A 222A.

The mapped forms 222A, . . . , 222N are a collection of form fields 226 with each form field 226 corresponding to a piece of data entered into a form document. The mapped forms 222A, . . . , 222N may include form fields 226 that correspond to one or more form documents. For example, "Medicare Page 1" is a form included in the "Medicare" form group. The mapped forms 222A, . . . , 222N may be data objects defined using five data types including:

1) Form group reference;
2) Description of the form;
3) Document;
4) Form identification; and
5) Form rules The form reference may correspond to the ID of the form group that includes the mapped form. The form description may include a string of text, table, list, array or other data type that provides more information about the form including, for example, the type of form, the title of the form, the service/organization that corresponds to the form, the length of the form, and the like. For example, "individual income tax form" may be a form description of a form required to report individual income tax. The document data type may list all of the documents including at least one of the fields included in the mapped form. For example, the document for the "individual income tax form" may include "IRS Form 1040". The form identification may include, for example, a string of text, alpha numeric sequence or other indenter (ID) for the form. The form rules may include conditional expressions or other logic that can be used to decide when a particular form needs to be submitted for a particular entity to apply for a service and/or complete an event. For example, the form rules may include one or more if, then statements or other conditional logic that may determine whether a particular user seeking to qualify for a service and/or complete an event is required to fill out the form.

The form fields 226 are a collection of data that is entered into a particular section of a form. Each of the mapped forms 222A, . . . , 222 may have a particular number of form fields that are required to be known in order to complete the mapped forms 222A, . . . , 222N. The form fields may be data objects defined using eight data types including:

1) Field identification;
2) Field description;
3) Data reference;
4) Data conversion;
5) Form reference;
6) Field location;
7) Field size; and
8) Field rules The field identification may include, for example, a string of text, alpha numeric sequence or other indenter (ID) for the form field 226. The field description may include a string of text, table, list, array or other data type that may include more information about the field including, for example, the type of field, the information that is entered into the field, and the like. For example, "birthdate—date and month" may be a description of a field that requires the entity completing the form to input that day and month her birthday. The data reference may correspond to a piece of entity data used to complete the form field 226. For example, the data reference may include a text string, sequence of alpha numeric characters of other identifier (ID) of a piece of entity data used to complete the form field 226. Data conversions correspond to other fields that may be calculated from the data used to complete the form field 226. For example, data conversions of a "birthday" form field may include age, legal status (i.e., adult, minor, etc.), and the like. Form reference may correspond to the ID of the form that includes the form field. Field location includes the location of the field within a document. For example, the field location of the "birthday" field of the "applicant information" form that corresponds to the "Medicare page 1" document may be "line 4, box 2" because the space to enter the applicant's birthday appears on line 4 in the box labeled 2 in the "Medicare page 1" document. Field size refers to the amount of space the form document provides for the data required to complete the form field 226. For example, "8 characters" or "1.2 inches", or "50 pixels" may be the field size for form fields having space for a string of 8 characters, a string that is 1.2 inches long, and/or a string that takes up 50 pixels of a display screen respectively. The field rules may include conditional expressions that can be used to decide when a particular field needs to be completed for a particular entity to complete the form corresponding to the form reference for the form field 226. For example, the field rules may include one or more if, then statements or other conditional logic that may determine whether a particular user seeking to complete a form event is required to fill out the form field 226.

Each of the form fields 226 may be associated with a piece of entity data 228 that completes the form field for a particular entity (e.g., a user completing an application). For example, the piece of data associated with a "birthday" form field 226 may be the user's birthday. Entity data 228 may be consumed by the completion service 240 in order to generate completed forms. Entity data 228 may be stored in a secure data service 227 or other data storage system that may encrypt or otherwise secure the entity data 228. The secure data service 227 may store entity data from multiple entities with each entity corresponding to a particular owner of the entity data 228. To ensure the form completion system does not store any personal data, the secure data service 227 may be compatible with a decentralized identity service or other self-sovereign identity service (e.g., Evernym) that replaces personal identifies such as usernames with IDs that are self-owned and independent. Each entity may be defined based on a relationship to the applicant completing the forms so that multiple users can complete forms for a particular applicant using the form completion engine 206. Entity data 228 may be different for each entity. For example, the entity data 228 for a parent entity (e.g., a parent filing out forms on behalf of his child) may be different than the entity data 228 for an applicant entity (e.g., a user filing out her own forms). Each entity may have a unique identifier and each piece of entity data 228 associated with a particular entity may be labeled with the unique identifier for the particular entity so that all of the entity data 228 for the particular entity may be accessed by the form completion engine 206 each time the particular entity wants to complete a form. Each piece of entity data 228 be a data object that is defined using six data types including:

1) Data type;
2) Data identification;
3) Data description;
4) Entity reference;
5) Data prompt; and
6) Data value The data type may include a particular format for the data, for example, text, date, signature, attachment, boolean, number list, continuum, and the like. Each data type may have one or more properties that further define the format for the data, for example, font, font size, font color, or other specification for text type data or a particular format (i.e., MM/DD/YYYY) for date type data. The data identification may include, for example, a string of text, alpha numeric sequence or other indenter (ID) for each piece of entity data. The data identification for a piece of entity data may correspond to the data reference of the field where the piece of entity data is inserted in order to complete the form. The data description may include a string of text, table, list, array or other data type that includes more information about the piece of data including, for example, the information included in the piece of data, uses of the piece of data, and the like. For example, "applicant's birthday" may be a description of a piece of data that includes the birth day, month, and year of an applicant entity. The entity reference may be the unique identifier for the entity that is associated with the entity data. The data prompt may be a question, request, or other string of text that is used to elicit the piece of data from the user. The data value is the piece of data itself, for example, a string of characters including the legal name of an applicant, may be the data value for a "applicant name" piece of data.

Each piece of entity data 228 may be used to complete multiple form fields 226. For example, the "name" entity data for an applicant entity may be used to fill a "name" and "preferred name" form fields. One or more rules 229 may be used to determine which form fields 226 need to be completed with entity data in order to complete a form. The rules 229 may apply to any of the hierarchical elements (e.g., form group rules, form rules, and field rules) described above and may be specific to a particular entity (i.e., applicant, parent, physician, CPA, and the like). The rules 229 for each of the hierarchical elements may be stored in the secure data service 227. The rules 229 may include one or more conditional expressions, fuzzy logic, machine learning models, or other logic that are used to determine if a particular component of the form process (e.g., form group, form, field) is required to be completed by a particular entity to apply for a service and/or complete an event. For example, a form group used to apply for California Child Services (CCS) benefits may have a form group rule that provides the conditional expression, "if entity is a California resident then CCS form group is required to apply for CCS benefits" that is used to determine when the CCS form group must be completed. Specific forms included in the CCS form group may have form rules that provide the series of conditional expressions, "if the entity is an English speaker, then CCS forms 1-8 are required to apply for CCS benefits" and "if the entity is a Spanish speaker, then CCS forms 9-14 are required to apply for CCS benefits" that are used to determine when specific CCS forms must be completed. The fields included in each of the forms may also have field rules that are used to determine when each of the fields are required to be completed. For example, the "parent's name" and "signature" fields may have a field rule that provides the conditional expression, "if the applicant entity has an age that is less than 18, then the field required" that is used to determine when each of these fields must be completed. The output of each of the rules is a boolean expression that indicates whether a particular entity is required to fill out the respective field, form, and/or form group.

Figure 3:
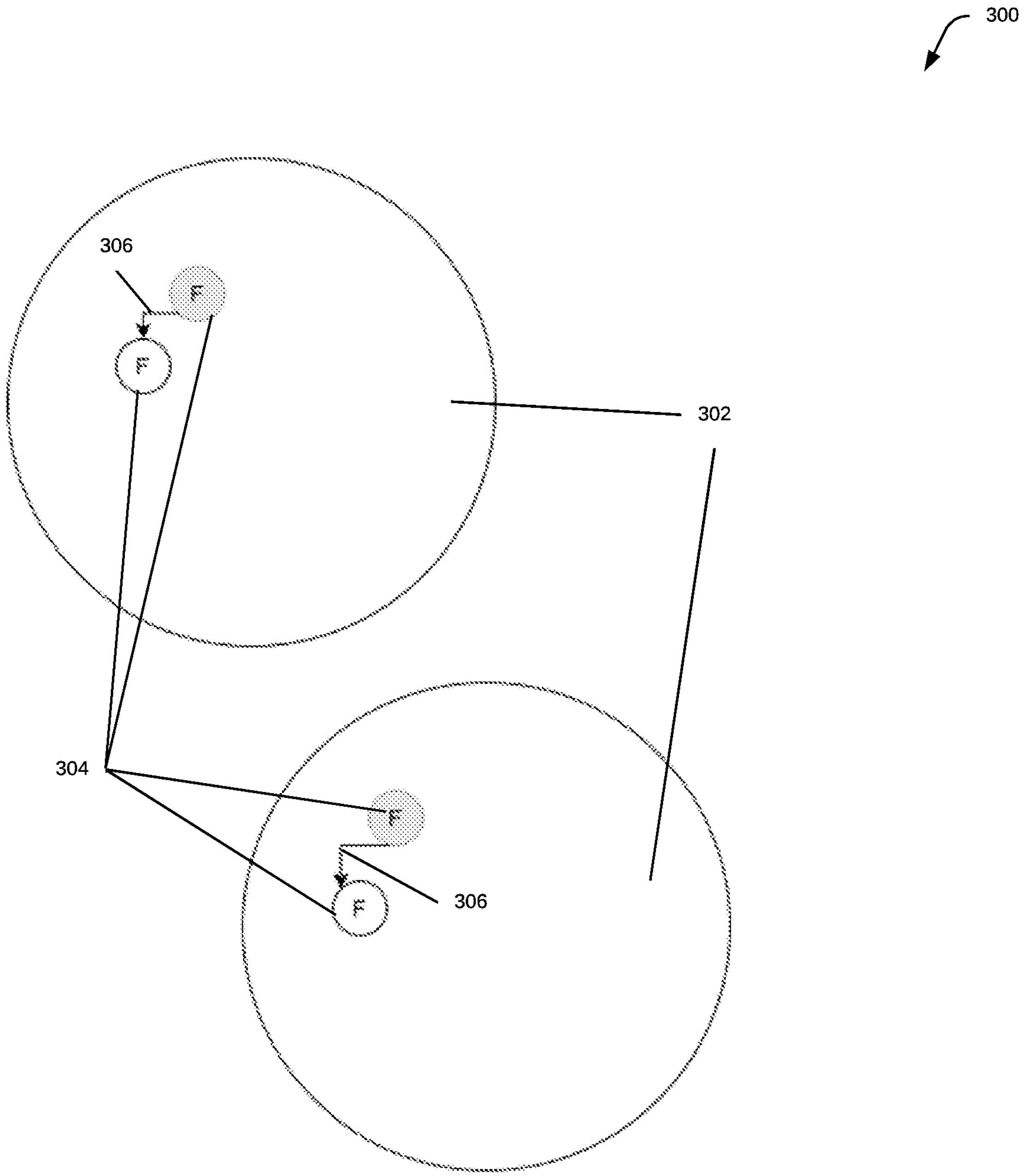
FIG. 3 illustrates an example flow graph that is under construction according to various embodiments of the present disclosure.

The rules 229 and entity data 228 may be used to construct flow graphs 236A, . . . , 236N that are used to determine the forms that are required to complete an event and/or apply for a service. The flow graphs 236A, . . . , 236N may be generated by the flow tool 234 included in the form mapping service 230. The flow graphs 236A, . . . , 236N may illustrate the relationships between forms. The flow tool may construct one or more subgraphs that include all of the forms required for a user based on the rules 229 for all the forms in the flow graph and the entity data for the user filling out the forms. FIG. 3 illustrates an example partially generated flow graph 300 that includes two clusters 302 and four vertices 304. The clusters 302 represent a collection of forms included in the same form group that are required to be completed by an entity in order to complete an event and/or apply for a particular service. The vertices 304 within the cluster 302 correspond to forms included in the form group that are required to be completed. Each cluster 302 includes two vertices 304 that are connected by an edge 306 that represents a dependency between the vertices 304. The dependency relationships between the vertices represented by the edges 306 may be determined based on the rules 229 and the entity data 228.

For example, specific entities (e.g., applicants, doctors, parents, caregivers, and the like) may be required to fill out particular forms within a form group. The requirement of one form may trigger a requirement to fill out one or more additional forms. Answers to a particular field included within a form may trigger the requirement to fill out one or more additional forms. Additionally, axioms or other predefined data associated with entities, organizations, form completion processes, form groups, forms, and/or fields may also trigger the requirement to fill out one or more forms. The entities, forms, fields, and axioms that trigger the requirement to complete forms may be defined in the form group, form, and field rules and in the entity data. Dependencies between forms that are derived from any of these data sources may be expressed as vertices 304 in the flow graph.

Figure 4:
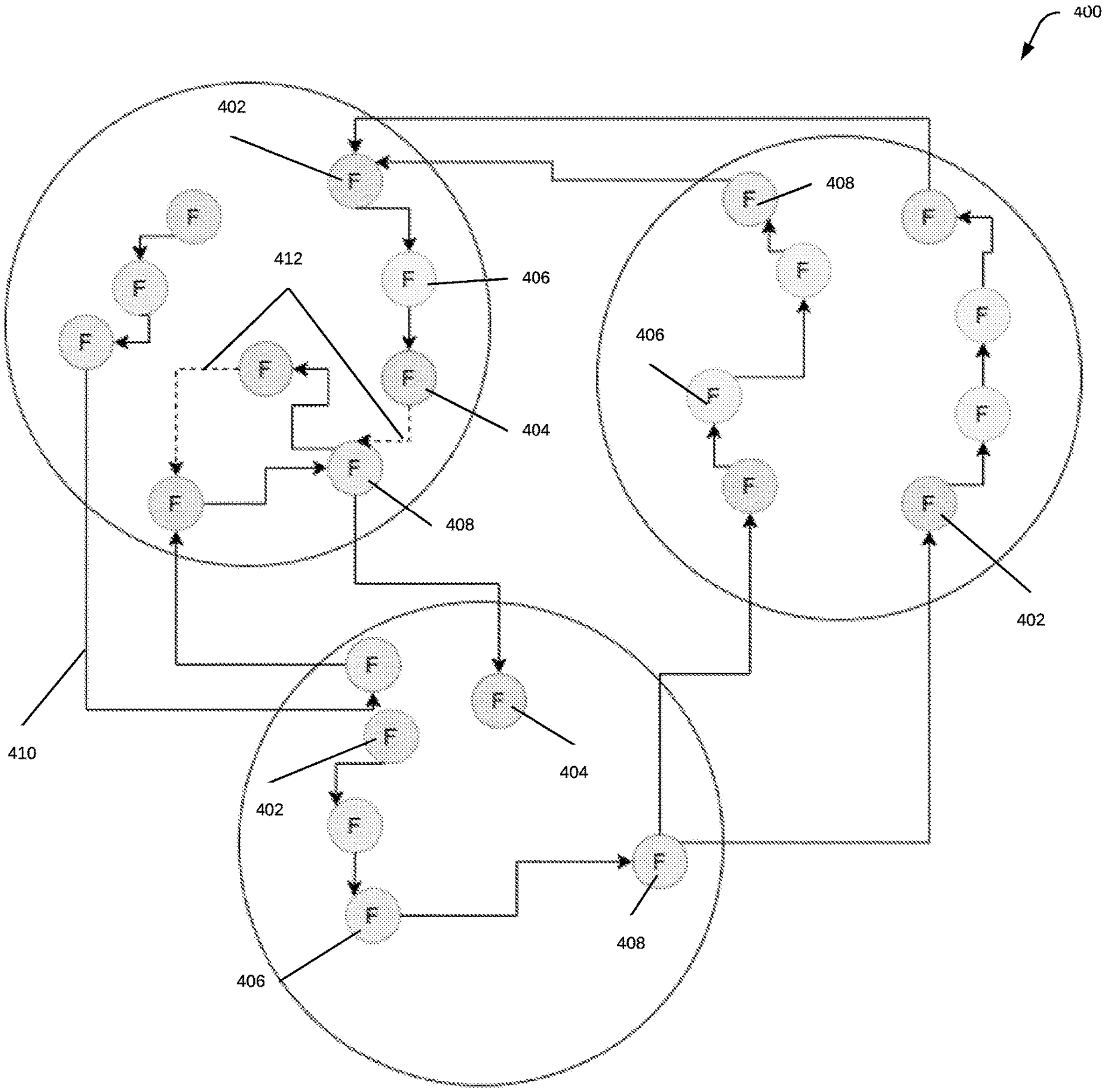
FIG. 4 illustrates a completed flow graph according to various embodiments of the present disclosure

The flow graph may include multiple vertex types with each vertex type corresponding to a particular role of a form within a cluster 302. FIG. 4 illustrates an example completed flow graph 400 including three clusters and multiple vertex types. To improve speed and computational efficiency, the flow graph may be an acyclic graph with all edges in the graph moving in one direction (e.g., forward toward a terminating node). To ensure the flow graph 400 does not a cyclical dependency, the edges in the flow graph may include solid line edges 410 and broken line edges 412. The solid line edges 410 represent a valid path that can be taken to traverse through flow graph 400 and the broken line edges 412 represent an invalid path that cannot be traversed. To ensure the walker is not stuck in a never ending loop within the flow graph 400, the flow tool generates an invalid path (i.e., broken line edge 412) whenever it identifies a cyclic dependency. For example, the flow tool may declare one or more of the edges in the cyclic dependence an invalid path to break the cyclic path to keep the graph acyclic. The node connected by the broken line edge 412 does not need to be evaluated since it has already been accounted for higher up in the dependency path. Therefore, the flow tool may ignore the invalid path represented by the broken line edge 412 and the broken line edge 412 does not appear on the final flow graph.

As shown, each cluster includes at least one entry vertex 402 shown in green, at least one mid vertex 406 shown in yellow, and at least one exit vertex 408 shown in blue. Two of the clusters also have at least one terminator vertex 404 shown in purple. The entry vertices 402 represent the first form in the cluster. The edges have a directional component that may be illustrated by the direction of the arrow used to represent each edge. The direction of the edge defines one vertex as the source vertex and one vertex as the impacted vertex. Entry vertices 402 represent the first form in the cluster, therefore, entry vertices 402 are the source vertex for the first edge and all edges in the cluster directly or indirectly originate from the entry vertices 402. Each edge represents a rule that either excludes or enables a form. Forms that are enabled by the entry vertices (e.g., forms that have a completion requirement that is triggered by the form corresponding to an entry vertex) may appear in the cluster as either mid vertices 406, exit vertices 408, or terminator vertices 404.

Terminator vertices 404 represent forms inside of a cluster that do not lead to other clusters. Accordingly, forms represented by terminator vertices 404 may have rules that exclude forms from other all form groups outside of the form group corresponding to the cluster. Forms represented by terminator vertices 404 may also have a competition requirement triggered by another form in the cluster and may trigger a requirement for completing other forms in the cluster. Exit vertices 408 represent the last form within a cluster, therefore, the forms represented by exit vertices 408 may have rules that exclude all other forms of the form group corresponding to the cluster. Forms represented by the exit vertices 408 may also have rules that enable one or more forms in another form group. Accordingly, exit vertices 408 in one cluster may share an edge with entry vertices in another cluster and forms represented by the exist vertices 408 may trigger the requirement of another form and/or form group. Mid vertices 406 are connected to multiple forms within a cluster, therefore, forms represented by mid vertices have a completion requirement triggered by another form in the same cluster and also include rules that trigger the requirement of one or more additional forms in the cluster. Flow graphs may also include one or more orphan vertices (not shown) that have no edges connecting the orphan vertices to other forms. Orphan vertices have no dependencies with other forms therefore only appear in the flow graph if an error occurs. Accordingly, detecting a flow graph that includes an orphan vertex may be an indicator that the form completion engine needs to be repaired. In various embodiments, the flow tool may determine the flow graph includes an entire cluster of vertices that are orphaned. To repair the flow graph including the orphaned cluster, the flow tool may generate a separate flow graphs for the orphaned cluster. Accordingly, the original flow graph may be split into two separate flow graphs and each of the flow graphs may be traversed by the flow walker to complete the forms required for a particular outcome.

Figure 5:
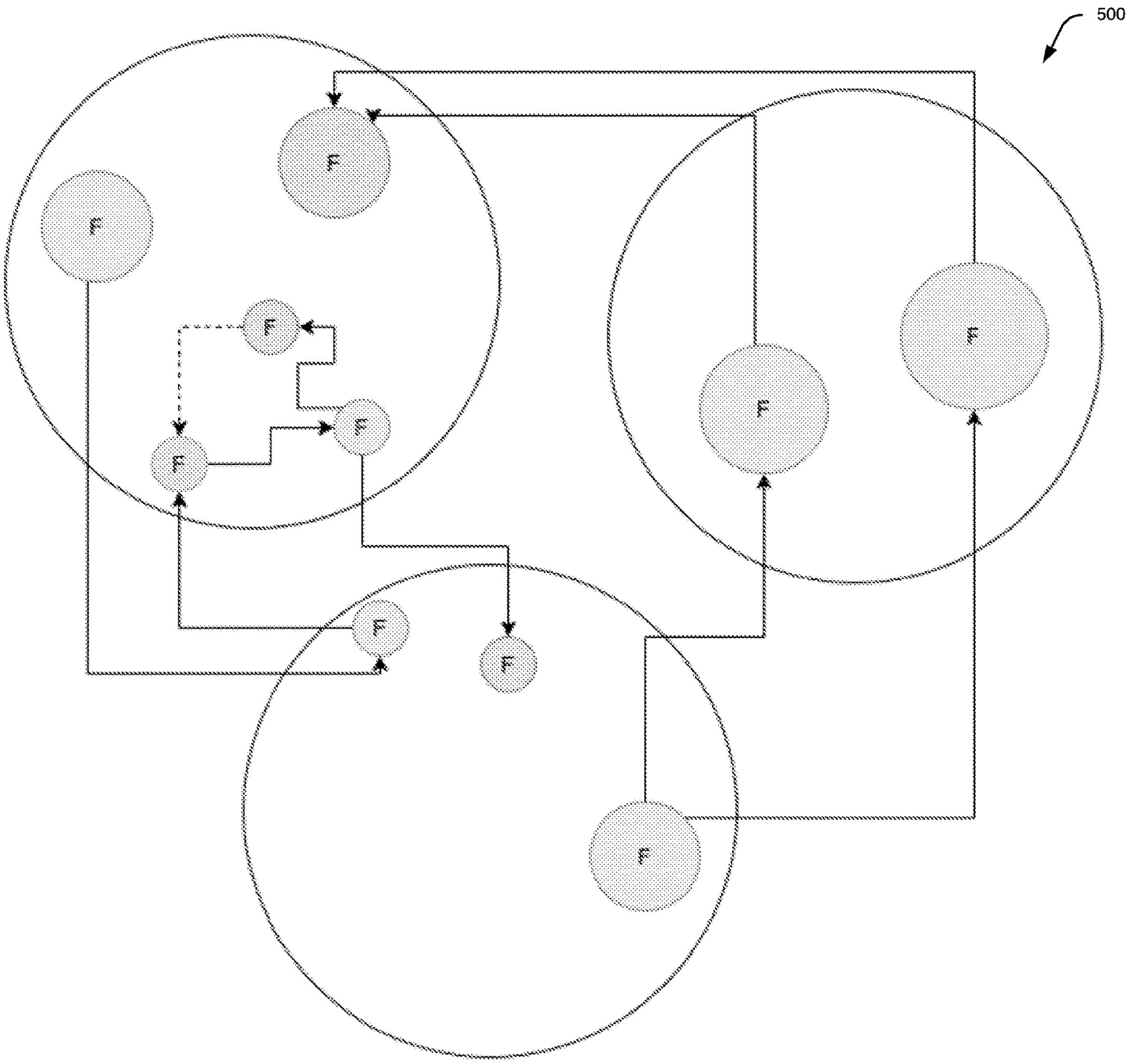
FIG. 5 illustrates a consolidated flow graph according to various embodiments according to various embodiments of the present disclosure.

FIG. 5 illustrates a consolidated flow graph 500 generated based on the completed flow graph shown in FIG. 4. As shown, the number of vertices in the consolidated flow graph 500 is reduced and the size of the vertices varies. Cluster simplification happens when there is only one valid path. For example, if Form 1, Form 2, and Form 3 do not provide any valid information about the user unless all three forms are filled out, the three forms in the cluster are combine them into one single "form". Using cluster simplification to consolidate the form may make the computations required to traverse the form more efficient by eliminating the paths and decencies between the combined forms. Additionally, cluster simplification may be used to combine a set of forms that may have one or more forms that provide useful information on their own but are also highly coupled. For example, if Form 1 may be used to collect useful but Form 1 is not valid or usable unless Form 2 and Form 3 are also completed, Form 1, Form 2, and Form 3 may be condensed into a single "form" to combine their dependencies as an all or nothing group. The consolidated cluster including three forms is treated as one big form instead of separate forms to reduce the number of dependencies, vertices, and edges included in the flow graph.

Cluster simplification may improve the computational efficiency of the form completion process. Form completion using standard clusters requires hitting the form gateway API for each form and stepping through the flow walker for every single vertex. Combining three forms into a single cluster reduces the network calls to the form service gateway from three separate requests to one single request. Additionally, the impacted vertices and valid dependencies for each form do not need to be constantly checked because the consolidated forms are all rolled into one and treated as a single "form" even though they're technically separate. This form consolidated further reduces the amount of computations during form completion. Form consolidation also avoids the problem where the flow walker goes on a tangent to some other form after a qualified path from Form 1 is already identified, for example, when Form 1, 2, and 3 must be submitted together. Form consolidation eliminates the redundant computations that would be required when Form A has to come back after the user finishes Form 1 and qualifies for Form A. Instead, form consolidation provides a more efficient process where the user first finishes Form 1, 2, and 3 and then move to Form A if they are qualified. This process improves the speed and efficiency of the form filling process by reducing the amount of redundant operations. Form consolidation is also required to maintain the acyclic forms by reducing the number of orphaned forms. For example, Forms 2 and 3 may be orphaned after the user completes Form 1 and qualifies for Form A. Users are not able to access forms 2 and 3 in the acyclic graph because the structure of the acyclic graph does not support backtracking. Accordingly, consolidating forms 2 and 3 into a simplified cluster with form 1 allows all three forms to be completed at once and eliminates the need to generate a separate flow graph just for the orphaned forms 2 and 3.

Referring now to FIG. 2, a flow walker 250 may navigate through the flow graphs 236A, . . . , 236N to facilitate completion of a form filling process. To complete a collection of forms required to complete an event, apply for a service, or perform another form filling process illustrated in a particular flow graph, the flow walker 250 may navigate through each field for every form included in each cluster of the particular flow graph. To fill in fields that are not included in entity data, a conversation tool 252 included in the flow walker 250 may generate questions 254 for each of the required fields included in the flow graph. The questions 254 may be generated based on the prompts for each of the pieces of data required by the fields and may include a question, request, or other string of text that elicits the information required by the field from a user. The questions 254 may be sent by the form completion engine 206 to a UI on a client device via the API gateway 204. A user may receive and view the questions 254 in the UI and use a keyboard, dropdown menu, slider bar, or other data input structure of the UI to input a user response to the questions 254. The form completion engine 206 may receive the user responses 244 by submitting an API call or other request to the API gateway 204. A completion service 240 may receive the user responses 244 add the user responses to the appropriate field of the form. The completion service 240 may also store the user responses 244 in entity data 228 so that the same question does not need to be sent to the user twice.

To fill in fields that are included in entity data 228, the completion service 240 may retrieve the data having the data identifiers that correspond to at least one of the field data references for the required fields from the secure data service 227. For example, the completion service 240 may look up the field data references for the required fields in the entity data 228 for a particular entity completing a collection of forms. The completion service 240 may retrieve all of the pieces of data having a data identifier that matches at least one of the field data references and may automatically fill in the fields with the appropriate retrieved entity data. The completion service 240 may also include a conversion tool 242 that may be used to derive additional pieces of data for other fields based on the existing entity data. For example, the conversion tool may perform one or more operations to convert one piece of known entity data into a piece of data that is required by a field but not included in entity data (e.g., calculate an entity's age or legal status based on the entity's birthdate). The conversion tool 242 and process for automatically filling in fields requiring pieces of data included in entity data 288 may reduce the number of questions 254 generated by the flow walker 250 and reduce the number of user responses 244 that must be submitted by entities to complete a collection of forms.

When completing forms, the completion service 240 may fill in all of the required fields that may be completed with entity data 288 first before the flow walker 250 generates questions 254 to illicit information form users that is used to fill in the required fields that cannot be completed using entity data 228. This process maximizes the number of fields that are completed using entity data 288 and reduces the number of questions 254 and user responses 244 that must be generated and received to complete the collection for forms. Minimizing the generated questions 254 and received user responses 244 increases the efficiency of automated form filling process performed by the form completion engine 206 by minimizing the number of computations executed to generate and transmit questions 254 to the client device and receive and process users responses 244.

The completion service 240 may fill in fields for the forms included in the flow graph using entity data 228, converted entity data, and user responses 244. Once all of the data for all the required fields of a particular form is filled in, the completion service 240 may generate a completed form 246 (e.g., a pdf or other document) for the particular form. Completed forms generated by the completion service 240 may be made available for download and submitted manually by users. The form completion engine 206 may also automatically submit completed forms 246 to an electronic file service or other form service of a government agency or other organization requiring the forms. For example, the form completion engine 206 may upload the completed forms 246 to a form service gateway 208 that submits the completed forms to the appropriate electronic file service.

The form completion engine 206 may also include an analytics service 256 that generates visualizations 258 and predictions 259 based on the flow graphs. For example, the analytics service 256 may generate visualizations 258 indicating form filling progress for a particular user and/or flow graph. Other visualizations 258 generated by analytics service 256 may include a table and/or chart indicating form filling processes previously completed by a user. The analytics service 256 may also generated graphs, charts, and other visualizations 258 that show the relationship between the rules, forms, and fields. These visualizations 258 may be generated in Figma or using another graphics design software. The analytics service 256 may also generate predictions 259 that identify the flow graphs for other collections of forms that correspond to services an entity could receive. The analytics service 256 may generate the predictions 259 based on axioms about particular services and the entity data 228 for the entity. Other predictions 259 generated by the analytics service 256 may recommend new services for a user to apply for based on the links between forms and clusters and the services associated with each cluster. For example, a rule that enables the Social Security form cluster if the user has an age greater than 65 may be used to link a tax form having an "age" field that receives a number greater than 65 to the Social Security page 1 form. Based on the link between the Social Security form cluster and the Tax form cluster, the analytics service 256 may generate a prediction 259 that recommends the user apply for Social Security benefits.

Figure 6:
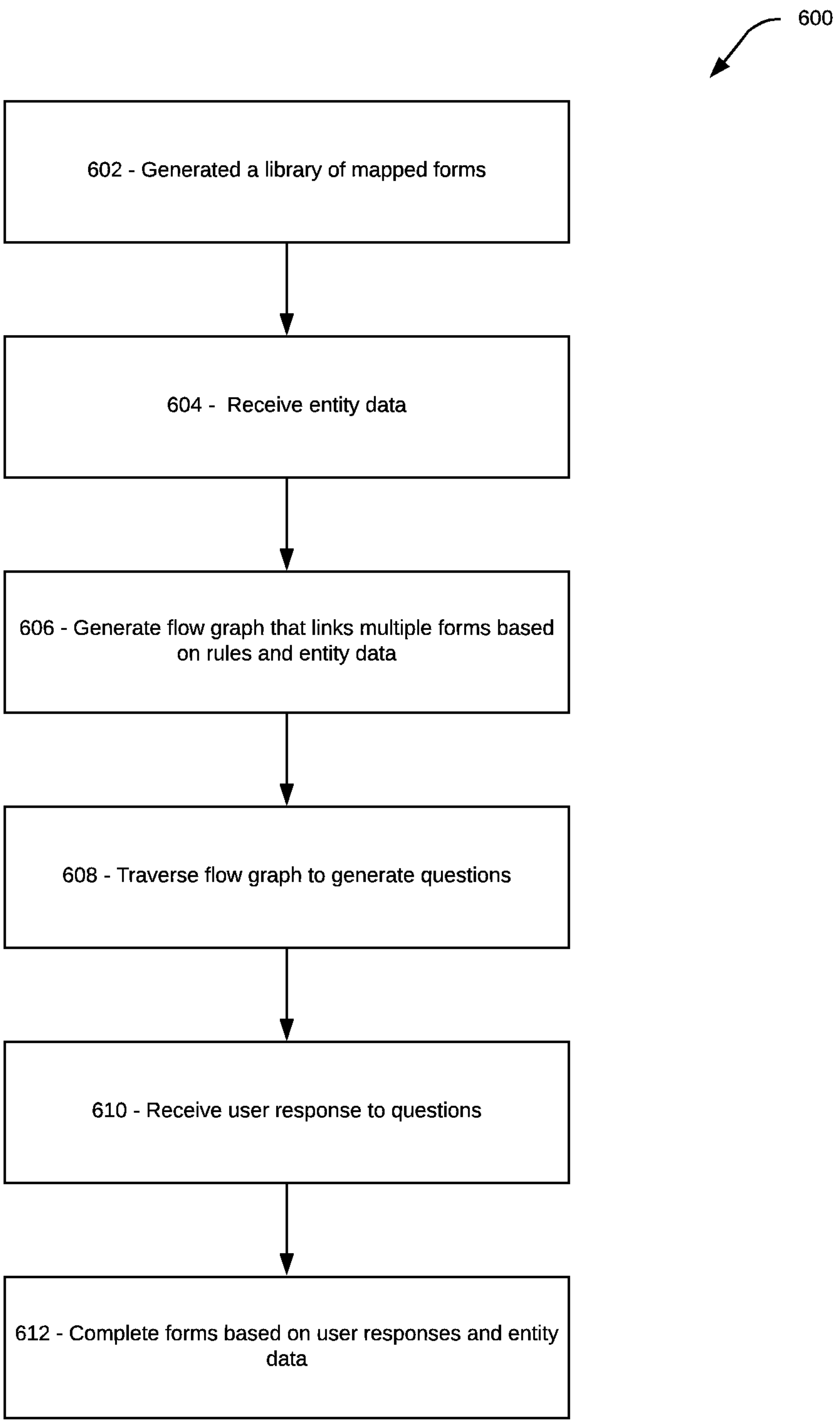
FIG. 6 is a flow diagram illustrating an example process for generating and using a flow graph according to various embodiments of the present disclosure.

FIG. 6 is a flow chart illustrating an exemplary process for completing forms using a flow graph 600. At 602, a library of mapped forms is generated by a form mapping service of the form completion engine. The form mapping service may generate the library of mapped forms by ingesting a form document to extract the fields included in the form, the data required by the fields, and the rules that define when the form and the respective fields within the form are required to be filled out. At 604, the form completion engine may receive entity data for an entity (e.g., an applicant, parent, caregiver, or other user that is completing forms) that is completing a least one of the mapped forms included in the library.

At 606, the form completion engine generates a flow graph based on rules and entity data. The flow graph may include a collection of forms that is required to be completed in order to complete an event, apply for a service, or perform some other form based task. The flow graph may also determine and illustrate dependency relationships between forms in order to identify a complete set of forms required for a particular form completion process. At 608, a flow walker may traverse the pre-rendered flow graph to generate questions that elicit data required to complete the forms. To collect the data required to complete the forms, the flow walker determines which paths are valid by collecting answers to the path conditionals from the questions sent to the user. To ensure all the data required to complete the forms is captured, the flow walker may traverse each field included in all of the forms of every cluster included in the flow graph. In various embodiments, the flow walker may present questions as a cyclical back and forth between the user receiving the questions, answering them, and getting new questions. This cyclical process may repeat until the flow walker collects all of the data required to complete all the forms quality for by the user.

At 610, the form completion engine receives user responses to the questions. For example, the form completion engine may receive user responses from a UI of a client device that receives the questions. The user responses may be text or other data input into the UI by users filling out the forms. At 612, the forms included in the form graph are completed by filling in each required field in the forms using the user responses, converted user responses, and/or existing entity data previously stored by the form completion engine. Completed forms generated by the form completion engine may be downloaded by users for manual submission and/or automatically uploaded to an electronic file service by the form completion engine.

Figure 7:
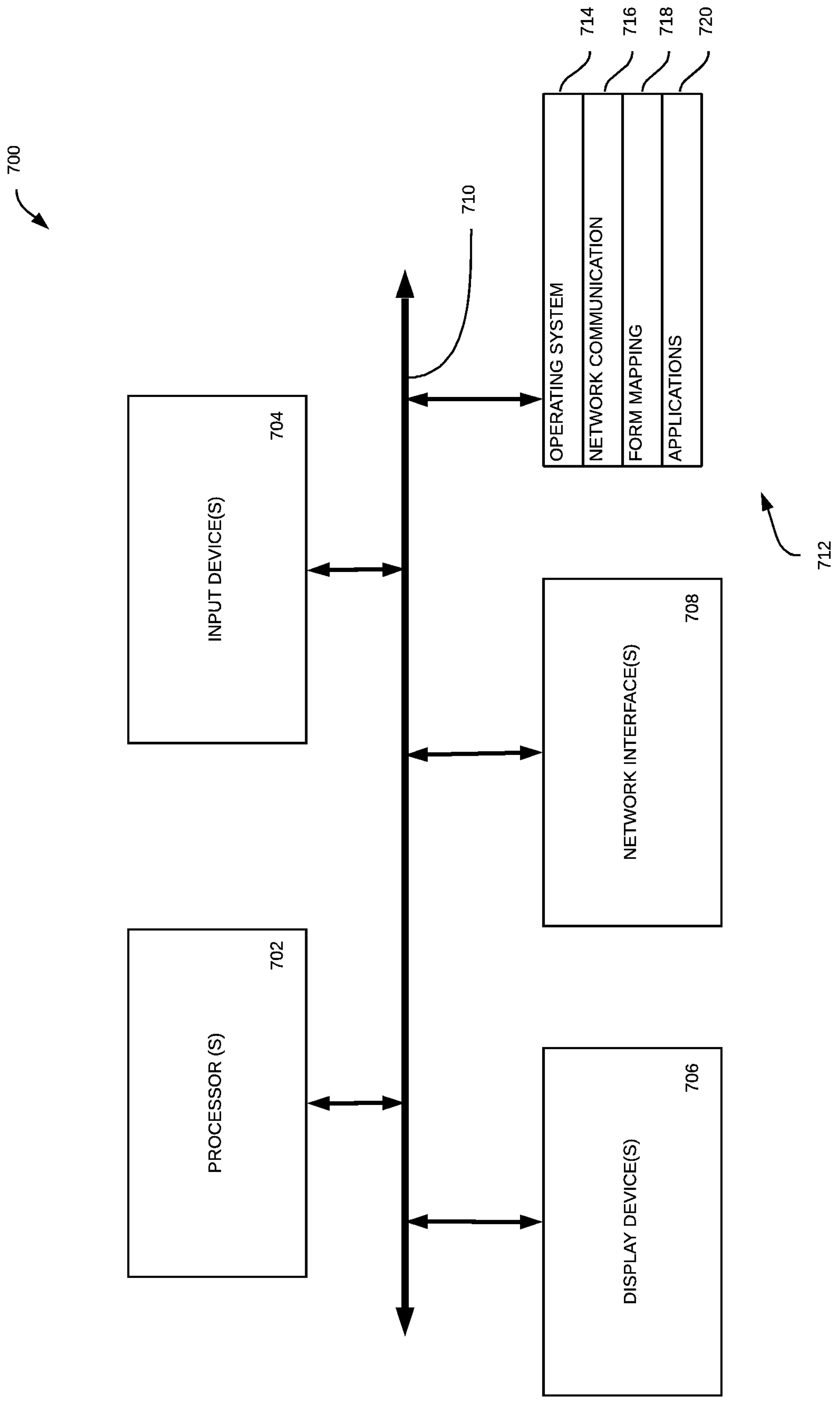
FIG. 7 is a block diagram illustrating an example computing device according to an embodiment of the present disclosure.

FIG. 7 shows an example computing device according to an embodiment of the present disclosure. For example, computing device 700 may function as client device 150, first server 120, second server 130. The computing device 700 may include a form completion engine that generates flow graphs and uses the flow graphs to complete collections for forms required to apply for a particular service. The computing device 700 may be implemented on any electronic device that runs software applications derived from compiled instructions, including without limitation personal computers, servers, smart phones, media players, electronic tablets, game consoles, email devices, etc. In some implementations, the computing device 700 may include one or more processors 702, one or more input devices 704, one or more display devices 706, one or more network interfaces 708, and one or more computer-readable mediums 712. Each of these components may be coupled by bus 710, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, camera, and touch-sensitive pad or display. Bus 710 may be any known internal or external bus technology, including but not limited to ISA, EISA, PCI, PCI Express, USB, Serial ATA or Fire Wire. Computer-readable medium 712 may be any non-transitory medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 712 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 712; controlling peripheral devices (e.g., disk drives, printers, etc.) which can be controlled directly or through an I/O controller; and managing traffic on bus 710. Network communications instructions 716 may establish and maintain network connections (e.g., software for implementing communication protocols, such as TCP/IP, HTTP, Ethernet, telephony, etc.).

Form mapping instructions 718 may include instructions that enable computing device 700 to generate flow graphs and use the flow graphs to complete collections of forms as described herein. Application(s) 720 may be an application that uses or implements the processes described herein and/or other processes. The processes may also be implemented in operating system 714. For example, application 720 and/or operating system may create tasks in applications as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the invention has been described with reference to the presently preferred embodiment, it should be understood that various modifications can be made without departing from the spirit of the invention. Accordingly, the invention is limited only by the following claims.

What is claimed is:

1. A computer implemented method of completing a form based application process, the method comprising:

obtaining a library of mapped forms, each form included in the library of mapped forms being associated with a form group and having multiple fields that need to be filled with data in order to complete the form;

receiving entity data for a user that is completing the form based application process;

generating a flow graph including one or more clusters including multiple vertices that correspond to forms included in the library of mapped forms, each of the one or more clusters and each of the vertices being connected by an edge that represents a dependency between the clusters or forms that are connected by the edge;

traversing the flow graph to generate at least one question that elicits a user response including a piece of data used to complete at least one field of a form that corresponds to a vertex included in the flow graph; and filling in data for the multiple fields included in each of the forms that correspond to a vertex included in the flow graph using the user response and the entity data to generate a completed form.

2. The method of claim 1, wherein the flow graph is an acyclic graph having a direction for each edge that moves toward a terminating node.

3. The method of claim 1, wherein the generating a flow graph further comprises identifying a cyclic dependency within the flow graph, the cyclic dependency including one or more edges that from a closed loop; and generating an invalid path for one or more edges in the cyclic dependency to break the closed loop.

4. The method of claim 3, wherein the invalid path is represented in the flow graph by a broken line edge.

5. The method of claim 1, further comprising determining, for at least one of the one or more clusters, multiple forms included in the at least one cluster are required to generate valid information; and combining the multiple forms into one cluster by removing the dependencies between the combined forms.

6. The method of claim 1, further comprising identifying one orphan cluster in the flow map; and generating a second flow map that includes all of the vertices and edges included in the orphan cluster.

7. The method of claim 6, further comprising filling in data for the multiple fields included in each of the forms that correspond to a vertex included in the flow graph and the second flow graph using the user response and the entity data to generate a completed form.

8. The method of claim 1, wherein the flow graph is generated using a segmented architecture including multiple tools.

9. The method of claim 8, wherein the multiple tools include a rules tool used to generate each form included in the library of mapped forms, the method further comprising exposing the rules tool to one or more subject matter experts independent of the other tools so that the one or more subject matter experts may use the rules tool to map new forms.

10. The method of claim 1, further comprising connecting to an electric file service;

uploading the completed form to a form service gateway; and submitting, via the form service gateway, the completed form to the electronic file service to achieve an outcome.

11. A system completing a form based application process, the system comprising:

a memory including executable instructions; and a processor configured to execute the executable instructions and cause the system to:

obtain a library of mapped forms, each form included in the library of mapped forms being associated with a form group and having multiple fields that need to be filled with data in order to complete the form;

receive an entity data for a user that is completing the form based application process;

generate a flow graph including one or more clusters including multiple vertices that correspond to forms included in the library of mapped forms, each of the one or more clusters and each of the vertices being connected by an edge that represents a dependency between the clusters or forms that are connected by the edge;

traverse the flow graph to generate at least one question that elicits a user response including a piece of data used to complete at least one field of a form that corresponds to a vertex included in the flow graph; and fill in data for the multiple fields included in each of the forms that correspond to a vertex included in the flow graph using the user response and the entity data to generate a completed form.

12. The system of claim 11, wherein the flow graph is an acyclic graph having a direction for each edge that moves toward a terminating node.

13. The system of claim 11, wherein the processor is further configured to generate a flow graph by identifying a cyclic dependency within the flow graph, the cyclic dependency including one or more edges that from a closed loop; and generating an invalid path for one or more edges in the cyclic dependency to break the closed loop.

14. The system of claim 13, wherein the invalid path is represented in the flow graph by a broken line edge.

15. The system of claim 11, wherein the processor is further configured to determine, for at least one of the one or more clusters, multiple forms included in the at least one cluster are required to generate valid information; and combine the multiple forms into one cluster by removing the dependencies between the combined forms.

16. The system of claim 11, wherein the processor is further configured to identify one orphan cluster in the flow map; and generate a second flow map that includes all of the vertices and edges included in the orphan cluster.

17. The system of claim 16, wherein the processor is further configured to fill in data for the multiple fields included in each of the forms that correspond to a vertex included in the flow graph and the second flow graph using the user response and the entity data to generate a completed form.

18. The system of claim 11, wherein the flow graph is generated using a segmented architecture including multiple tools.

19. The system of claim 18, wherein the multiple tools include a rules tool used to generate each form included in the library of mapped forms, and the processor is further configured to expose the rules tool to one or more subject matter experts independent of the other tools so that the one or more subject matter experts may use the rules tool to map new forms.

20. The system of claim 11, wherein the processor is further configured to connect to an electric file service;

upload the completed form to a form service gateway; and submit, via the form service gateway, the completed form to the electronic file service to achieve an outcome.

* * * * *